(12) United States Patent
Girardey (10) Patent No.: US 10,228,664 B2
(45) Date of Patent: Mar. 12, 2019

(54) FIELD DEVICE FOR DETERMINING OR MONITORING A PROCESS VARIABLE IN AUTOMATION TECHNOLOGY

(71) Applicant: Endress + Hauser GmbH + Co. KG, Maulburg (DE)

(72) Inventor: Romuald Girardey, Blotzheim (FR)

(73) Assignee: ENDRESS+HAUSER SE+CO.KG, Maulburg (DE)

(*) Notice: Subject to any disclaimer, the term of this patent is extended or adjusted under 35 U.S.C. 154(b) by 1088 days.

(21) Appl. No.: 14/415,817

(22) PCT Filed: Jun. 26, 2013

(86) PCT No.: PCT/EP2013/063430
§ 371 (c)(1),
(2) Date: Jan. 20, 2015

(87) PCT Pub. No.: WO2014/016074
PCT Pub. Date: Jan. 30, 2014

(65) Prior Publication Data
US 2015/0177707 A1    Jun. 25, 2015

(30) Foreign Application Priority Data
Jul. 23, 2012 (DE) .................. 10 2012 106 652

(51) Int. Cl.
*G05B 9/03* (2006.01)

(52) U.S. Cl.
CPC .................... *G05B 9/03* (2013.01)

(58) Field of Classification Search
CPC .............. G05B 9/00; G05B 9/02; G05B 9/03
See application file for complete search history.

(56) References Cited

U.S. PATENT DOCUMENTS

| 4,752,869 A | 6/1988 | Miller |
| 8,612,920 B2 | 12/2013 | Girardey |
| 8,812,262 B2 | 8/2014 | Grittke |

(Continued)

FOREIGN PATENT DOCUMENTS

| DE | 102009026785 A1 | 8/2010 |
| DE | 102009002734 A1 | 11/2010 |

(Continued)

OTHER PUBLICATIONS

German Search Report, German Patent Office, Munich, DE, dated Feb. 19, 2013.

(Continued)

*Primary Examiner* — Michael Maskulinski
(74) *Attorney, Agent, or Firm* — Bacon & Thomas, PLLC (57) ABSTRACT

A field device for determining or monitoring a process variable in automation technology, wherein the field device meets a safety standard, which is required in a predetermined safety-critical application, comprising a sensor, which works according to a defined measuring principle, and a control/evaluation unit, which processes and evaluates measurement data delivered by the sensor along at least three redundantly and/or diversely designed measuring channels, and wherein there is associated with the control/evaluation unit a voter, which is composed of a plurality of components, which are at least partially double redundantly designed.

13 Claims, 4 Drawing Sheets

(56) References Cited

U.S. PATENT DOCUMENTS

| | | | |
|---|---|---|---|
| 2006/0116803 A1* | 6/2006 | Armbruster | G05B 9/03 701/48 |
| 2006/0142954 A1 | 6/2006 | Muller | |
| 2009/0195256 A1* | 8/2009 | Meagher | G05B 9/02 324/537 |
| 2011/0087460 A1* | 4/2011 | Girardey | G05B 9/02 702/182 |
| 2011/0313580 A1 | 12/2011 | Bakhmach | |
| 2012/0004860 A1* | 1/2012 | Girardey | G05B 9/03 702/22 |

FOREIGN PATENT DOCUMENTS

| | | |
|---|---|---|
| DE | 102009028938 A1 | 3/2011 |
| WO | 2004013585 A1 | 2/2004 |
| WO | 2009062954 A1 | 5/2009 |
| WO | 2010086073 A1 | 8/2010 |

OTHER PUBLICATIONS

International Search Report, EPO, The Netherlands, dated Dec. 5, 2013.
English Translation of the International Preliminary Report on Patentability, WIPO, Geneva, CH, dated Feb. 5, 2015.

\* cited by examiner

Malfunction in Measuring Channel

| MK | comparator | | failure detection | | | comment |
|---|---|---|---|---|---|---|
| 1 failure | 1 ≠ 2 | true | (1 ≠ 2) & (1 ≠ 3) | true | MK1 shut down | |
| | 1 ≠ 3 | true | (2 ≠ 1) & (3 ≠ 1) | true | MK1 shut down | |
| 2 OK | 2 ≠ 1 | true | (2 ≠ 1) & (2 ≠ 3) | false | | malfunction detected in MK1; MK1 is turned off or masked out |
| | 2 ≠ 3 | false | (1 ≠ 2) & (3 ≠ 2) | false | | |
| 3 OK | 3 ≠ 1 | true | (3 ≠ 1) & (3 ≠ 2) | false | | |
| | 3 ≠ 2 | false | (1 ≠ 3) & (2 ≠ 3) | false | | | a)

Malfunction in Comparator Stage

| MK | comparator | | failure detection | | | comment |
|---|---|---|---|---|---|---|
| 1 OK | 1 ≠ 2 | true | (1 ≠ 2) & (1 ≠ 3) | false | | |
| | 1 ≠ 3 | false | (2 ≠ 1) & (3 ≠ 1) | false | | |
| 2 OK | 2 ≠ 1 | false | (2 ≠ 1) & (2 ≠ 3) | false | | malfunction has no effect |
| | 2 ≠ 3 | false | (1 ≠ 2) & (3 ≠ 2) | false | | |
| 3 OK | 3 ≠ 1 | false | (3 ≠ 1) & (3 ≠ 2) | false | | |
| | 3 ≠ 2 | false | (1 ≠ 3) & (2 ≠ 3) | false | | | b)

Malfunction in MK and Comparator Stage

| MK | comparator | | failure detection | | | comment |
|---|---|---|---|---|---|---|
| 1 failure | 1 ≠ 2 | false | (1 ≠ 2) & (1 ≠ 3) | false | | |
| | 1 ≠ 3 | true | (2 ≠ 1) & (3 ≠ 1) | true | MK1 shut down | |
| 2 OK | 2 ≠ 1 | true | (2 ≠ 1) & (2 ≠ 3) | false | | malfunction is still detected. MK1 is turned off or masked out |
| | 2 ≠ 3 | false | (1 ≠ 2) & (3 ≠ 2) | false | | |
| 3 OK | 3 ≠ 1 | true | (3 ≠ 1) & (3 ≠ 2) | false | | |
| | 3 ≠ 2 | false | (1 ≠ 3) & (2 ≠ 3) | false | | | c)

Fig. 3

Malfunction in Measuring Channel and Failure Detection Stage

| MK | | comparator | | failure detection | | | comment |
|---|---|---|---|---|---|---|---|
| 1 | failure | 1 ≠ 2 | true | (1 ≠ 2) & (1 ≠ 3) | false | | Malfunction is still detected. MK1 is turned off or masked out |
| | | 1 ≠ 3 | true | (2 ≠ 1) & (3 ≠ 1) | true | MK1 shut down | |
| 2 | OK | 2 ≠ 1 | true | (2 ≠ 1) & (2 ≠ 3) | false | | |
| | | 2 ≠ 3 | false | (1 ≠ 2) & (3 ≠ 2) | false | | |
| 3 | OK | 3 ≠ 1 | true | (3 ≠ 1) & (3 ≠ 2) | false | | |
| | | 3 ≠ 2 | false | (1 ≠ 3) & (2 ≠ 3) | false | | | d)

Malfunction in Failure Detection Stage

| MK | | comparator | | failure detection | | | comment |
|---|---|---|---|---|---|---|---|
| 1 | OK | 1 ≠ 2 | false | (1 ≠ 2) & (1 ≠ 3) | true | MK1 herunterfahren | MK1 is incorrectly turned off or masked out, but MK2 and MK3 still function |
| | | 1 ≠ 3 | false | (2 ≠ 1) & (3 ≠ 1) | false | | |
| 2 | OK | 2 ≠ 1 | false | (2 ≠ 1) & (2 ≠ 3) | false | | |
| | | 2 ≠ 3 | false | (1 ≠ 2) & (3 ≠ 2) | false | | |
| 3 | OK | 3 ≠ 1 | false | (3 ≠ 1) & (3 ≠ 2) | false | | |
| | | 3 ≠ 2 | false | (1 ≠ 3) & (2 ≠ 3) | false | | | e)

Malfunction in MK, Comparator Stage and Failure Detection Stage

| MK | | comparator | | failure detection | | comment |
|---|---|---|---|---|---|---|
| 1 | failure | 1 ≠ 2 | false | (1 ≠ 2) & (1 ≠ 3) | false | malfunction is not detected |
| | | 1 ≠ 3 | true | (2 ≠ 1) & (3 ≠ 1) | false | |
| 2 | OK | 2 ≠ 1 | true | (2 ≠ 1) & (2 ≠ 3) | false | |
| | | 2 ≠ 3 | false | (1 ≠ 2) & (3 ≠ 2) | false | |
| 3 | OK | 3 ≠ 1 | true | (3 ≠ 1) & (3 ≠ 2) | false | |
| | | 3 ≠ 2 | false | (1 ≠ 3) & (2 ≠ 3) | false | | f)

Fig. 3

FIELD DEVICE FOR DETERMINING OR MONITORING A PROCESS VARIABLE IN AUTOMATION TECHNOLOGY

TECHNICAL FIELD

The invention relates to a field device for determining or monitoring a process variable in automation technology. The field device is so embodied that it meets a safety standard, which is required in a predetermined safety-critical application. The field device includes a sensor, which works according to a defined measuring principle, and a control/evaluation unit, which processes and evaluates measurement data delivered by the sensor along at least three redundantly and/or diversely designed measuring channels.

BACKGROUND DISCUSSION

One solution for this is known from Published International Application WO 2004/013585 A1. In automation technology, especially in process automation technology, field devices are applied, which serve for determining and monitoring process variables. Examples of such field devices are fill level measuring devices, flow measuring devices, analytical measuring devices, pressure and temperature measuring devices, moisture and conductivity measuring devices, density and viscosity measuring devices. The sensors of these field devices register the corresponding process variables, e.g. fill level, flow, pH-value, substance concentration, pressure, temperature, humidity, conductivity, density or viscosity.

The terminology 'field devices' includes in connection with the invention, however, also actuators, e.g. valves or pumps, via which, for example, the flow of a liquid in a pipeline or the fill level in a container is changeable. A large number of such field devices are available from members of the company, Endress+Hauser.

As a rule, field devices in modern automation technology plants are connected via communication networks (such as HART multidrop, point to point connection, Profibus, Foundation Fieldbus) with a superordinated unit, e.g. a control system or a control room. The superordinated unit serves for process control, for process visualizing, for process monitoring as well as for start-up and for servicing of the field devices. Supplemental components necessary for operation of fieldbus systems and directly connected to a fieldbus and serving especially for communication with the superordinated unit are likewise frequently referred to as field devices. Examples of these supplemental components include remote I/Os, gateways, linking devices, controllers and wireless adapters.

Depending on application, field devices must satisfy the most varied of safety requirements. In order to satisfy the respective safety requirements, e.g. those of IEC61508 (SIL-standard 'safety integrity level'), the field devices must be designed redundantly and/or diversely.

"Redundantly" refers to increased safety via two or more different designs of all safety relevant hard- and software components. "Diversely" means that the hardware components, such as e.g. microprocessors, located in the different measuring channels, come from different manufacturers and/or are of a different type. In the case of software-components, diversity requires that the software stored in the microprocessors comes from different sources, e.g. from different manufacturers, respectively different programmers. Through all these measures it should be assured that a safety critical failure of the field device as well as the occurrence of simultaneously arising systematic failures are excluded with high probability as the measured value is being provided.

An example of a safety-relevant application is fill level monitoring in a tank, in which a flammable or also a nonflammable but nevertheless water-endangering liquid is present. In such case, it must be assured that the supply of liquid to the tank is immediately interrupted, as soon as a maximum allowable fill level has been achieved. This, in turn, assumes that the measuring device detects the fill level highly reliably, thus that the measuring device works faultlessly.

While in the case of known solutions the measurement channel is redundantly and/or diversely designed, nevertheless, the evaluation unit, usually a microprocessor, which is designed as a voter, represents the Achilles' heel of a field device. The microprocessor should satisfy the highest safety requirements. The microprocessor is monolithically embodied. If there is in such case a dangerous failure (corresponding to the nomenclature of the above mentioned standards), then the whole field device fails. In order to fulfill the SIL 3 standard, the fraction of dangerous failures to the number of all possible failures must not exceed 1%. This safety level cannot be achieved with a conventional microprocessor.

SUMMARY OF THE INVENTION

An object of the invention is to provide a field device distinguished by increased functional safety.

The object is achieved by features including that the control/evaluation unit is triple redundantly and/or diversely designed and that there is associated with the control/evaluation unit a voter, which is composed of a plurality of components, which are at least partially double redundantly designed. With the voter of the invention, even the high safety requirements of SIL 3 can be fulfilled.

In an advantageous further development of the field device of the invention, it is provided that the voter is embodied as a majority voter and has at least three components: A comparator stage, which compares the output signals delivered by the individual measuring channels with one another, a failure recognition stage, which by suitable gating of the output signals of the comparator stage detects a failure occurring in a measurement channel, and an output selection stage. As will be explained below in more detail, the voter can be implemented with very simple subcomponents.

Seen as especially favorable in connection with the field device of the invention is when the voter is composed of a plurality of voter channels, wherein each voter channel includes a part of the comparator stage and a part of the failure recognition stage, and when each voter channel is embodied as an integrated component of the associated measurement channel. Since it is further provided that each measurement channel has its own voltage supply, the predetermined safety level remains present, even when one measurement channel or its voltage supply is completely lost.

In a preferred embodiment of the field device of the invention, the comparator stage includes in each voter channel two comparators, which compare the output signal of the selected measurement channel, in each case, with the output signal of the remaining measurement channels, so that the output signals of the three measurement channels are doubly compared by redundant comparators.

Preferably, the failure recognition stage is a logic stage, which is constructed of logic gates. Further seen as advantageous is when each logic stage is composed of two AND gates and an OR gate or of an equal valued gate combination, wherein connected to the inputs of the first AND gate are the output signals of the comparators of the first voter channel associated with the selected measurement channel, and wherein connected to the second AND gate are the output signals of the comparators of the second voter channel and of the third voter channel redundant to the inputs of the first AND gate, and wherein the output signals of the first AND gate and of the second AND gate form the input signals of the following OR gate. Since the voter for three measurement channels has six comparators and six failure recognition units, the information concerning a failure occurring in a measurement channel is doubly redundant. Added to this is the fact that information concerning a failure occurring doubly in a measurement channel is won via components, which are distributed among two measurement channels. Due to this arrangement, also a failure, which occurs in the comparator stage or in the failure recognition stage can be detected.

Especially, the output selection stage is so embodied that it selects either a measurement channel, when no failure or a failure in one of the measurement channels or in one of the voter channels occurs, or that it generates a failure report, when at least two failures occur in at least two measuring channels and/or two voter channels.

A preferred form of embodiment of the field device of the invention provides that the output selection stage has a multiplexer, which is so embodied that it selects between the output signals of the measurement channels and an alarm signal as a function of the output signals of the failure recognition stage.

In an advantageous embodiment, the control/evaluation unit with measuring channels and/or the associated components of the voter, respectively the voter channels, is embodied in the measuring channels at least partially as a reconfigurable logic chip with a plurality of partially dynamically reconfigurable function modules.

Furthermore, it is provided that the control/evaluation unit so configures the function modules in the measuring channels as a function of the respectively defined safety-critical application that the field device meets the required safety standard. Considered as advantageous in this connection is when besides software based and hardware based measuring channels at least one measurement channel is configured analog-based in a FPAA (Field Programmable Analog Array).

For this, there is associated with the control/evaluation unit at least one microprocessor, which dynamically partially reconfigures the function modules of a measurement channel and/or a voter channel, in which a failure has been detected. In order to optimize the performance of the logic chip, the at least one microprocessor is permanently configured in a static region of the logic chip.

In order to fulfill the required safety standard, the individual measurement channels are so spaced from one another that a temperature and/or voltage change in a measurement channel has no influence on a neighboring measurement channel.

Known from Published International Application, WO 2009/062954 A1 is a field device for determining or monitoring a process variable in process automation. The field device is composed of a sensor, which works according to a defined measuring principle, and a control/evaluation unit, which processes and evaluates measurement data delivered by the sensor as a function of a safety standard required in the respective safety-critical application along at least two equal valued measuring paths. The known control/evaluating unit is at least partially embodied as a reconfigurable logic chip (FPGA) having a plurality of partially dynamically reconfigurable function modules. The control/evaluation unit configures the function modules in the measuring paths as a function of the respectively defined safety critical application in such a manner that the field device is designed corresponding to the required safety standard. WO 2009/062954 A1 mentions options for how failures in the measuring channels are detected and removed. This disclosure is incorporated into the present disclosure.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
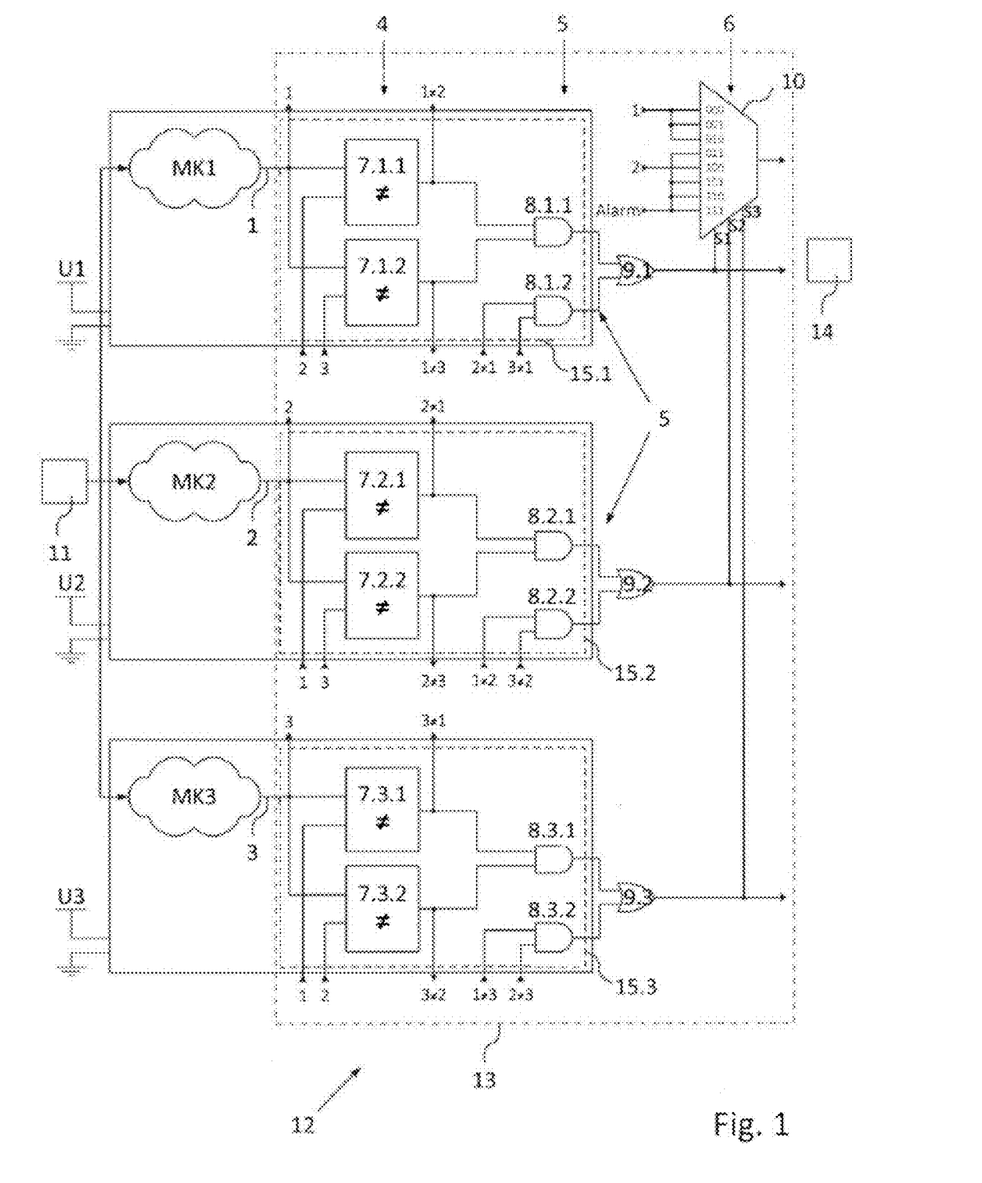
FIG. 1 is a block diagram of a preferred embodiment of the control/evaluation unit with the double redundantly designed voter of the invention.

FIG. 1 shows a block diagram of a preferred embodiment of a control/evaluation unit 12 usable in connection with the field device of the invention. The control/evaluation unit 12 is distinguished by a doubly redundant voter 13. For this, at least some of the components of the voter are doubly redundant.

The voter 13 shown in FIG. 1 is embodied as a majority voter and includes three components, respectively stages:
a comparator stage 4, which compares the output signals 1, 2, 3 delivered by the individual measuring channels MK1, MK2, MK3 with one another;
a failure recognition stage 5, which by suitable gating of the output signals 1, 2, 3 of the comparator stage 4 detects a failure occurring in a measurement channel MK1; MK2; MK3, and
an output selection stage 6.

The voter 13 (dashed lines) includes a plurality of voter channels 15.1, 15.2, 15.3, wherein each voter channel 15.1, 15.2, 15.3 (dashed lines) includes a part of the comparator stage 4 and a part of the failure recognition stage 5 and wherein each voter channel 15.1, 15.2, 15.3 is embodied as an integrated component of the associated measurement channel MK1; MK2; MK3. Each measurement channel MK1, MK2, MK3 with integrated voter channel 15.1, 15.2, 15.3 has its own voltage supply U1, U2, U3 (solid lines).

The comparator stage 4 of a voter channel 15.1, 15.2, 15.3 includes two comparators 7, which compare the output signal 1; 2; 3 of a selected measurement channel MK1; MK2, MK3, in each case, with the output signal 1; 2; 3 of a remaining measurement channel MK1, MK2, MK3. Especially, output signals 1, 2, 3 of the three measurement channels MK1, MK2, MK3 are compared doubly by redundant comparators 7.

In the illustrated case, the failure recognition stage 5 is embodied as a logic stage and constructed of logic gates 8, 9. Each logic stage 5 integrated in a measurement channel MK1, MK2, MK3 is composed of two AND gates 8 and one OR gate 9. If we consider the voter channel 15.1 with the measurement channel MK1, the comparator stage 4 in the shown case is composed of two comparators 7.1.1, 7.1.2 and the failure recognition stage 5 is composed of the AND gates 8.1.1, 8.1.2 and the OR gate 9.1. The OR gate 9.1 belongs to the failure recognition stage 4, but is, however, outside of the voter channel 15.1.

The output signal 1 of the measurement channel MK1 and the output signal 2 of the measurement channel MK2 are applied to the comparator 7.1.1, while the output signal 1 of the measurement channel MK1 and the output signal 3 of the measurement channel MK3 are compared with one another at the comparator 7.1.2. Analogous comparisons of the output signals 1, 2, 3 of the measurement channels MK1, MK2, MK3 are made in the two voter channels 15.2, 15.3. In general, it can be said that, in each of the measurement channels MK1; MK2; MK3, the output signal 1, 2, 3 of the corresponding measurement channel MK1; MK2; MK3 is compared with the output signals 1, 2, 3 of the remaining measurement channels MK1; MK2, MK3. Via the redundant comparators 7.1.1, 7.1.2, 7.2.1, 7.2.2, 7.3.1, 7.3.2, differences $1 \neq 2$, $1 \neq 3$, $2 \neq 1$, $3 \neq 3$, $3 \neq 1$, $3 \neq 2$ in the output signals 1, 2, 3 of the measurement channels MK1, MK2, MK3 are detected. The accuracy in the comparison of the output signals 1, 2, 3 of two measuring channels MK1, MK2; MK3 via one of the comparators 7.1.1, 7.1.2, 7.2.1, 7.2.2, 7.3.1, 7.3.2 is determined by the accuracy of the measurement channel MK1, MK2, MK3 with the least accuracy. If the accuracy of the measurement channel MK1 amounts to, for example, 1% and the accuracy of the measurement channel MK2 to 0.1%, then the comparators 7.1.1, 7.2.1 compare the two measurement channels MK1, MK2 with an accuracy of 1%.

In order to find out, in which measurement channel MK1, MK2, MK3 a failure has occurred, the outputs of the comparators 7.1.1, 7.1.2, 7.2.1, 7.2.2, 7.3.1, 7.3.2 are forwarded to the AND gates 8.1.1, 8.1.2, 8.2.1, 8.2.2, 8.3.1, 8.3.2. Especially, the output signals $1 \neq 2$, $1 \neq 3$ of the comparator stage 4 with the comparators 7.1.1, 7.1.2 are applied to the first AND gate 8.1.1, while the output signals $2 \neq 1$, $3 \neq 1$, which come from the measuring channels MK2, MK3, go to the second AND gate 8.1.2. Since there are associated with the three measuring channels MK1, MK2, MK3 six comparators 7.1.1, 7.1.2, 7.2.1, 7.2.2, 7.3.1, 7.3.2 and six failure recognition components 8.1.1, 8.1.2, 8.2.1, 8.2.2, 8.3.1, 8.3.2, the information concerning a malfunction in one of the measurement channels MK1, MK2, MK3 occurs, in each case, doubly redundantly. Additionally, the information also originates from different measuring channels MK1, MK2, MK3.

This embodiment of the redundant voter 13 solution has the advantage of detecting, besides a malfunction in a measurement channel MK1, MK2, MK3, also a malfunction in the comparator stage 4 or in the failure recognition stage 5 or in a combination of the different components 4, 5. Tables showing the possibilities of failure detection by means of the solution of the invention are presented in FIG. 3*a* to FIG. 3*f*. As soon as a failure in one of the measurement channels MK1, MK2, MK3 is detected, the corresponding measurement channel MK1, MK2, MK3 is masked out—is thus no longer taken into consideration for providing a value, e.g. a measured value,—and/or—in case such opportunity is present as a result of the application of a reconfigurable FPGA—, in given cases, reconfigured. If the control/evaluation unit 12 is embodied as a partially dynamically reconfigurable FPGA, the components, which have caused the malfunction, can be partially dynamically reconfigured.

In a preferred embodiment of the field device of the invention, the comparator stage 4 and the failure recognition stage 5 are mostly doubly redundantly constructed and distributed over different measurement channels MK1, MK2, MK3. Since the control/evaluation unit 12 must lastly output a single value, the output must be embodied as one channel. This is achieved by the feature that the output selection stage 6 is only singly present. A malfunction of the output selection stage 6 can, thus, not be detected. In the illustrated case, the output selection stage 6 is formed by a multiplexer 10, which ascertains the output value based on the output signals S1, S2, S3 delivered by the failure recognition stages 5.

Preferably, the output selection stage 6—e.g. a multiplexer 10—is so embodied that it either selects a measurement channel MK1, MK2, MK3 as correctly functioning, when no malfunction is present, or when only one malfunction occurs in one of the measurement channels MK1, MK2, MK3 or in one of the voter channels 15.1, 15.2, 15.3. The output selection stage 6 generates a failure report, when at least two malfunctions occur in at least two measuring channels MK1, MK2, MK3 and/or in at least two voter channels 15.1, 15.2, 15.3. The multiplexer 10, thus, as a function of the output signals of the failure recognition stage 5, selects between the output signals 1, 2, 3 of the measurement channels MK1, MK2, MK3 and an alarm signal.

Figure 2:
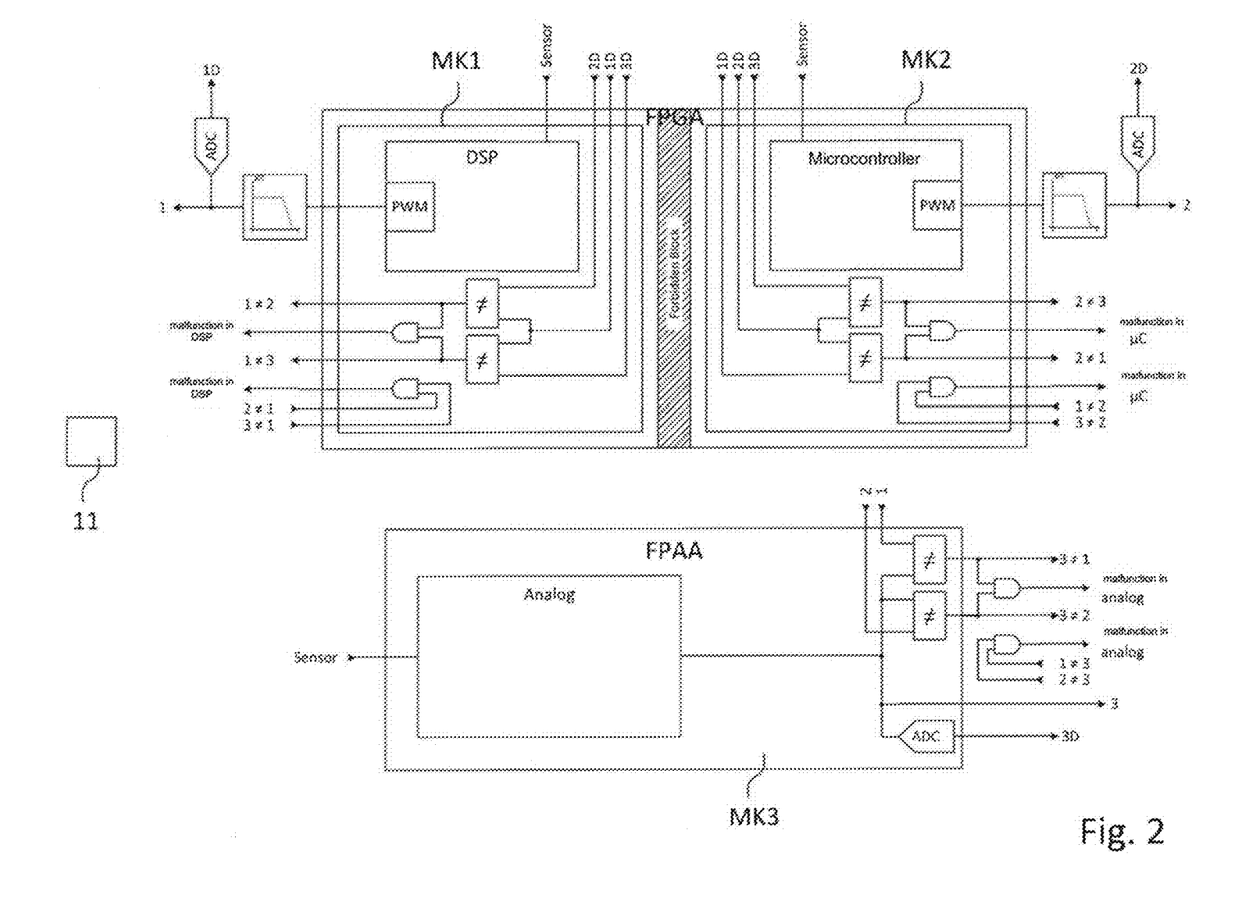
FIG. 2 is a block diagram of a preferred embodiment of the control-evaluation unit, which can be applied in the field device of the invention.

FIG. 2 shows a block diagram of a preferred embodiment of the redundantly embodied control/evaluation unit 12 of the field device of the invention.

Preference is given in FIG. 2, for example, to the measurement channel MK1. Measurement channel MK1 is, thus, the selected measurement channel. It is always selected when no malfunction at all occurs, or when a malfunction is detected in measurement channel MK2 or in measurement channel MK3. If a malfunction is detected in the measurement channel MK1, then the measurement channel MK2 is the selected measurement channel. If more than one malfunction occurs, then an alarm signal is set. This procedure is advantageous, when the control/evaluation unit 12 has measurement channels MK1, MK2, MK3 of different accuracies. A corresponding control/evaluation unit 12 is shown, by way of example, in FIG. 2. The measurement channels MK1, MK2 with, respectively, the DSP (Digital Signal Processor) and the microcontroller have the highest accuracy for the signal processing. The analog measurement channel MK3, which in the shown case is embodied based on an FPAA, has the least accuracy for the signal processing. Thus, usually always the measurement channel MK1, MK2 with the highest accuracy is selected as reference measurement channel (measurement channel with the highest priority). In the illustrated case, this is the measurement channel MK1. MK1 is selected as reference measurement channel, as long as no malfunction occurs in it. If a malfunction appears in the measurement channel MK1, then the measurement channel MK2 with the next higher accuracy becomes the reference measurement channel. As long as no malfunction occurs in one of the measurement channels MK1, MK2, then the signal processing of the sensor 11, respectively the field device, occurs with the high accuracy of the measurement channels with the DSP, respectively the microcontroller. The relatively inexact analog measurement channel MK3 is only used, in order to detect a malfunction in one of the measurement channels MK1, MK2.

Presented in FIGS. 3a to 3f are tables, which illustrate the failure analysis of the control/evaluation unit 12 with the redundant voter 13 used according to the invention. Considered in the analysis are only the components per se or in combination, which are redundantly present, i.e. the measurement channels MK, the comparator stages 4, and the failure recognition stages 5. Since the non-redundant part of the components of the control/evaluation unit 12 is small, the safety of the field device is influenced thereby only in small measure. A failure in the microprocessor 14 would also lead in the case of the solution of the invention to a wrong output value of the field device, which is a sensor in the illustrated case.

Figure 3:
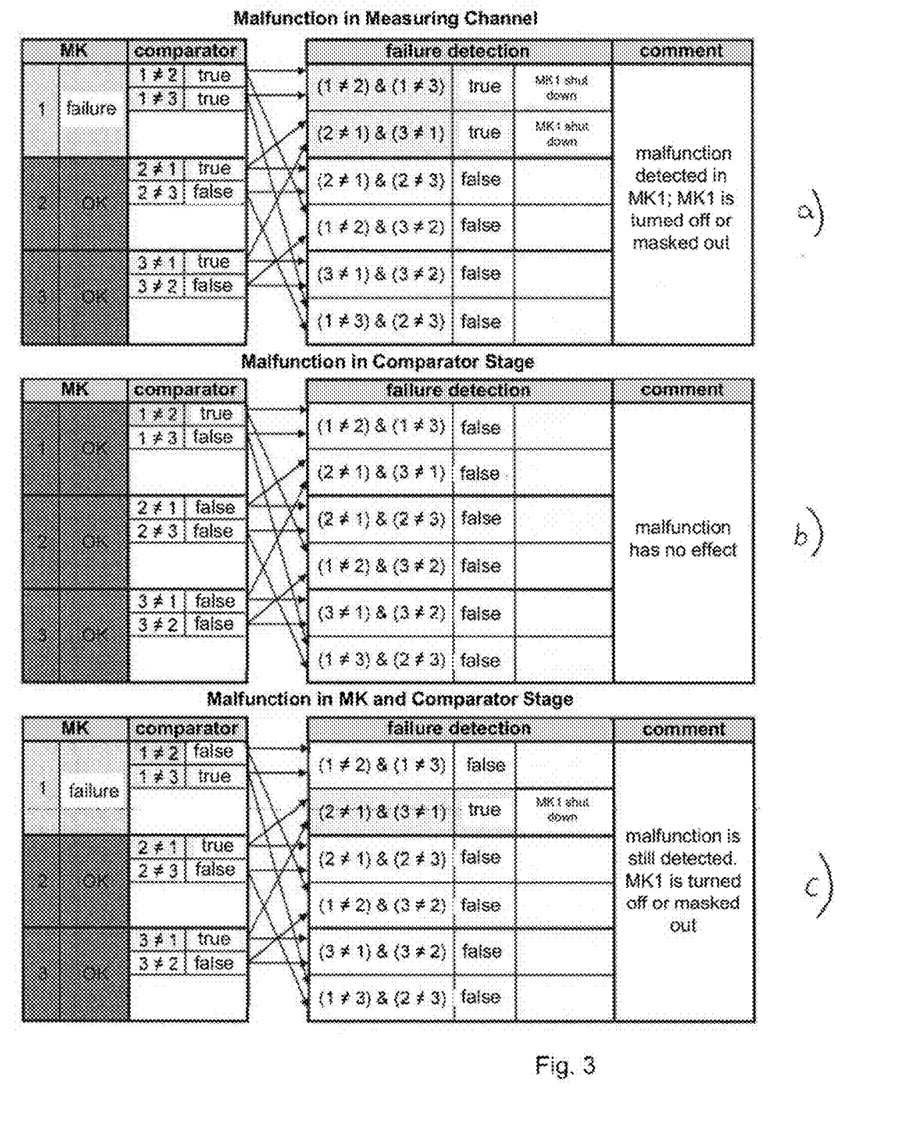
FIGS. 3a-3f shows tables, which illustrate the failure analysis of the redundant voter equipped, control/evaluation unit used according to the invention.

In detail, FIGS. 3a-3f illustrate the following cases:

FIG. 3a: a malfunction in one of the measurement channels MK.

FIG. 3b: a malfunction in one of the comparator stages 4.

FIG. 3c: a malfunction in one of the measurement channels MK and in one of the associated components of the comparator stages 4.

FIG. 3d: a malfunction in one of the measurement channels MK and in one of the associated components of the failure recognition stages 5.

FIG. 3e: a malfunction in one of the failure recognition stages 5.

FIG. 3f: a malfunction in one of the measurement channels MK1, MK2, MK3, in one of the associated components of the comparator stage 4 and in one of the associated components of the failure recognition stage 5.

In general, it can be stated that malfunctions in the individual components, measurement channels MK (FIG. 3a), comparator stage 4 (FIG. 3b) and failure recognition stage 5 (FIG. 3e) can be detected or masked out by means of the solution of the invention. Furthermore, it is possible to assure the functioning of the field device, even when two malfunctions occur in the control/evaluation unit 12 (FIG. 3c, FIG. 3e). The solution of the invention fails only when malfunctions occur in a measurement channel MK1, MK2, MK3 and in each component of the associated voter channel 15.1, 15.2, 15.3 (FIG. 3f), or when the corresponding malfunctions are distributed over two measurement channels. However, the probability for such an accumulation of failures is so small that the required high safety requirements—especially of SIL 3—can be fulfilled.

As already mentioned above, it is especially advantageous when there is associated with the control/evaluation unit 12 at least one microprocessor 14, which dynamically reconfigures, respectively partially dynamically reconfigures, the function modules of the defective measurement channel MK and/or of the defective voter 13.

Furthermore, it is provided that the individual measurement channels MK—in FIG. 2, these are the measurement channels MK1, MK2—are so spaced from one another that a temperature and/or voltage change in a measurement channel MK1 have/has no influence on a neighboring measurement channel MK2. Preferably, for the case, in which the control/evaluation unit 12 is implemented on a logic chip FPGA and is dynamically, respectively partially dynamically, reconfigurable, the microprocessor 14 is permanently configured in a static region of the logic chip FPGA. Corresponding embodiments are already described in the earlier cited International Patent Application of the applicant.

The invention claimed is:

1. A field device for determining or monitoring a process variable in automation technology, wherein the field device meets a safety standard, which is required in a predetermined safety-critical application, comprising:
   a sensor, which works according to a defined measuring principle;
   a control/evaluation unit, which processes and evaluates measurement data delivered by said sensor along at least three redundantly and/or diversely designed measuring channels; and
   a voter which is associated with said control/evaluation unit and which is composed of a plurality of components, which are at least partially double redundantly designed and which is embodied as a majority voter and has three components: a comparator stage, which compares output signals delivered by said individual measuring channels with one another, a failure recognition stage, which by correlating the output signals of said comparator stage detects a failure occurring in a measuring channel of said individual measuring channels, and an output selection stage, wherein
   said output selection stage has a multiplexer, which is so embodied that it makes a selection between the output signals of said measuring channels and an alarm signal, as a function of the output signals of said failure recognition stage.

2. The field device as claimed in claim 1, wherein:
   said voter is composed of a plurality of voter channels, wherein each voter channel includes a part of said comparator stage and a part of said failure recognition stage; and
   each voter channel is embodied as an integrated component of an associated measuring channel.

3. The field device as claimed in claim 2, wherein:
   said comparator stage includes in each voter channel two redundant comparators, which compare an output signal of a selected measuring channel, in each case, with an output signal of remaining measuring channels, so that output signals of the three measuring channels are doubly compared by said two redundant comparators.

4. The field device as claimed in claim 3, wherein:
   said failure recognition stage is a logic stage, which is constructed of logic gates.

5. The field device as claimed in claim 4, wherein:
   each logic stage is composed of two AND gates and an OR gate;
   connected to inputs of a first AND gate are output signals of two redundant comparators of a first voter channel associated with the selected measuring channel;
   connected to a second AND gate are output signals of said two redundant comparators of a second voter channel and of a third voter channel redundant to the inputs of said first AND gate; and
   the output signals of said first AND gate and of said second AND gate form input signals of said following OR gate.

6. The field device as claimed in claim 3, wherein:
   said output selection stage is so embodied that it either selects a measuring channel, when no failure or a failure in one of the three measuring channels or in one of said voter channels occurs, or that it generates a failure report, when at least two failures occur in at least two measuring channels and/or two voter channels.

7. The field device as claimed in claim 2, wherein:
   said control/evaluation unit with said measuring channels and/or associated components of said voter, respectively said voter channels, is embodied in said measuring channels at least partially as a reconfigurable logic chip (FPGA) with a plurality of partially dynamically reconfigurable function modules.

8. The field device as claimed in claim 7, wherein:
said control/evaluation unit so configures the partially dynamically reconfigurable function modules in said measuring channels as a function of the respectively defined safety-critical application that the field device meets the required safety standard.

9. The field device as claimed in claim 7, wherein:
there is associated with said control/evaluation unit at least one microprocessor, which partially dynamically reconfigures the partially dynamically reconfigurable function modules of a measuring channel of said diversely designed measuring channels and/or a voter channel of said voter, in which a failure has been detected.

10. The field device as claimed in claim 9, wherein:
said at least one microprocessor is configured permanently in a static region of the logic chip (FPGA).

11. The field device as claimed in claim 1, wherein:
each measuring channel has its own voltage supply.

12. The field device as claimed in claim 1, wherein:
at least one of the three measuring channels is configured analog-based in an FPAA.

13. The field device as claimed in claim 1, wherein:
the individual measuring channels are so spaced from one another that a temperature and/or voltage change in a measuring channel have/has no influence on a neighboring measuring channel.

* * * * *